US007156356B2

(12) United States Patent
Blattner

(10) Patent No.: US 7,156,356 B2
(45) Date of Patent: Jan. 2, 2007

(54) FOLDABLE STAND

(76) Inventor: Robert R. Blattner, Two Richmond Hill Rd., Norwalk, CT (US) 06854

( * ) Notice: Subject to any disclaimer, the term of this patent is extended or adjusted under 35 U.S.C. 154(b) by 4 days.

(21) Appl. No.: 10/846,211

(22) Filed: May 14, 2004

(65) Prior Publication Data

US 2004/0262466 A1 Dec. 30, 2004

Related U.S. Application Data

(60) Provisional application No. 60/470,551, filed on May 14, 2003.

(51) Int. Cl.
*F16M 11/32* (2006.01)
*F16M 11/38* (2006.01)

(52) U.S. Cl. ...................... 248/440; 108/115; 182/152; 248/166

(58) Field of Classification Search ................ 248/166, 248/170, 172, 173, 440, 188, 188.6; 182/152, 182/154, 155–157; 108/115, 118, 123, 132
See application file for complete search history.

(56) References Cited

U.S. PATENT DOCUMENTS 314,986 A * 4/1885 Aenis ......................... 451/360
573,756 A * 12/1896 Bergstresser ................ 108/31
1,614,818 A * 1/1927 Basford ...................... 248/166
1,653,764 A * 12/1927 Goodwin .................... 248/164
1,692,704 A * 11/1928 Rohrig .................... 280/43.16
1,890,710 A * 12/1932 Williams .................... 108/175
2,415,784 A * 2/1947 Block ......................... 211/200
3,139,277 A 6/1964 Mears
4,192,480 A * 3/1980 Schmidt ..................... 248/436
4,268,020 A 5/1981 Wood
4,298,094 A * 11/1981 Strong ........................ 182/155
4,468,150 A 8/1984 Price
4,756,642 A 7/1988 Quinn et al.
4,759,660 A 7/1988 Corbett
4,776,545 A 10/1988 Miyamoto
4,792,130 A 12/1988 Ardent
4,944,633 A 7/1990 Robb
5,290,124 A 3/1994 Pavlescak
5,377,779 A 1/1995 Slapnicka
2004/0262466 A1* 12/2004 Blattner ...................... 248/166

* cited by examiner

*Primary Examiner*—Carl D. Friedman
*Assistant Examiner*—Tan Le
(74) *Attorney, Agent, or Firm*—St. Onge Steward Johnston & Reens LLC

(57) ABSTRACT

The invention relates to a foldable stand having a left leg, a right leg, and a brace pivotably connected to both left and right legs. The brace has a first part and a second part where the first and second parts are pivotably connected to each other and wherein the stand folds and unfolds upon the brace pivoting relative to the first and second legs and the first part pivoting relative to the second part.

22 Claims, 5 Drawing Sheets

FOLDABLE STAND

PRIOR APPLICATION

Applicant claims priority benefits under 35 U.S.C. §119 (e) of U.S. Provisional Patent Application Ser. No. 60/470, 551 filed May 14, 2003.

FIELD OF THE INVENTION

The invention relates to foldable and portable stands, racks and sawhorses.

BACKGROUND OF THE INVENTION

When performing work on a work piece, a frame or trestle may be used to support the work piece so that a user's hands are free to manipulate or finish the work piece. Further, the user need not constantly hold the work piece, which may be tiresome or, in the event the work piece is large or cumbersome.

Hence, traditional sawhorses were developed to help support the work piece. A typical sawhorse includes vertical legs nailed to a horizontal beam. Such a sawhorse is often fixedly assembled and usually entails being stored or moved in its completed form.

Hardware pieces are normally used for the legs to the beam to form the sawhorse. In the event the sawhorse is disassembled, there is usually no convenient way to keep these hardware pieces together and they may be misplaced.

Further developments may have been developed to make storage and transportation of sawhorses more convenient. U.S. Pat. No. 5,377,779 to Slapnicka appears to relate to a sawhorse having a horizontal beam that is removably attached to four legs that extend vertically from the horizontal beam. There seems to be four brace rods, each one connecting a midpoint of a leg to the horizontal beam. Because Slapnicka may entail attaching and detaching each leg and each brace rod each time the sawhorse is to be assembled and disassembled, the sawhorse in the disassembled state may involve multiple loose pieces, which may further involve increased time and complexity due to the quantity of pieces to arrange and the possibility of misplacing pieces that would need to be replaced. This problem may be exacerbated when a user misplaces the assembly or disassembly directions and has difficulty recalling such procedures.

U.S. Pat. No. 4,776,545 seems to relate to a stand for supporting a work piece. However, because the parts of the stand seem to require they be bolted together, the stand may not be easily or quickly assembled or disassembled. Further, similar to Slapnicka, missing parts, misplacing assembly or disassembly directions, and the user having difficulty recalling assembly or disassembly procedures may further increase time and complexity of assembling or disassembling the stand.

U.S. Pat. No. 4,268,020 to Wood seems to relate to a collapsible support device. However, because one side of the device seems to support a load differently than the other side of the device, the device may be unstable and/or inadequate.

In the area of boating, various types of shoring structures may have been devised and used for supporting boat hulls for dry dock storage and maintenance. Because of the wide variety of hull shapes, keels and boat sizes, these structures have generally been custom constructed at the maintenance or storage site for particular boats using basic timber elements, tie rods, and jack stands. Examples of such custom constructed stands are found in U.S. Pat. No. 3,139,277 to Mears and U.S. Pat. No. 4,756,642 to Quinn, and U.S. Pat. No. 4,759,660 to Corbett. These types of constructions may require that individual jack stands be placed about the boat hull and individually adjusted, with the addition of some cross supports between jack stands.

U.S. Pat. No. 4,468,150 to Price and U.S. Pat. No. 4,944,633 to Robb appears to provide cradle type supports which can accommodate boats of varying sizes by providing means for inwardly tilting jack stands mounted on a base structure. These types of cradles typically entail tensioning tie rods or other types of supports with multiple adjustments and fastenings. In addition, cradle type boat stands may rely on skewing the jack stands to accommodate hulls of varying widths and lengths. Skewed supports, however, are inherently less stable than vertical supports. Therefore, these types of stands may not provide sufficient stability nor be easy to store or move.

What is desired, therefore, is a foldable stand that is quick and easy to assemble and disassemble. What is also desired is a foldable stand that reduces or eliminates loose pieces or the complexity of assembling and disassembling the foldable stand. A further desire is a foldable stand that adequately and steadily supports a load placed on the stand.

SUMMARY OF THE INVENTION

It is, therefore, an object of the invention to provide a foldable stand that my be easily opened and closed.

Another object is to provide a foldable stand that may be operated without assembly or disassembly instructions.

A further object is to provide a foldable stand that may be operated free from loose parts.

A still further object is to provide a foldable stand that has adequate structural integrity.

These and other objects of the invention are achieved by a foldable stand having a left leg, a right leg, and a brace pivotably connected to both left and right legs. The brace has a first part and a second part where the first and second parts are pivotably connected to each other and wherein the stand folds and unfolds upon the brace pivoting relative to the first and second legs and the first part pivoting relative to the second part.

The foldable stand may also include a second brace pivotably connected to both the left and right legs, wherein the second brace has a first part pivotably connected to a second part.

The foldable stand also has a stop for inhibiting pivoting of the brace relative to the first and second legs and for inhibiting pivoting of the first part relative to the second part, wherein the stand is in an open position when the brace comes in contact with the stop.

In some embodiments, the stop is a side wall of the first leg. In further embodiments, the stop may be any structure that inhibits pivoting of the rotating pieces of the stand.

The foldable stand includes a horizontal member connecting a top of the left leg to a top of the right leg for supporting a work piece or load placed on the stand. The horizontal member may be at least one flexible strap or a rigid beam.

The left leg may optionally include at least one vertical support and at least one horizontal support.

The foldable stand includes the brace being pivotably connected to the second brace at an intersection point between the braces at a distance approximately half way between the right and left legs. In some embodiments, the foldable stand may include a distance between the intersection of the brace and the second brace and an intersection of the first part and the second part is approximately equal to a distance between an intersection of the first part and the left leg and a halfway point between the intersection of the first part and the left leg and the second brace and the left leg.

In another aspect of the invention, a foldable stand has a left leg, a right leg, a first brace pivotably connecting an upper part of the left leg to a lower part of the right leg, and a second brace pivotably connecting an upper part of the right leg to a lower part of the left leg. Each of the first and second braces has a first part and a second part, the first and second parts being pivotably connected to each other. The invention also has the first brace being pivotably connected to the second brace at an intersection point between the first brace and the second brace at a distance approximately half way between said first and second legs. The stand folds and unfolds upon the first and second braces pivoting relative to the left and right legs and the first parts pivoting relative to the respective second parts.

The foldable stand may include a distance between an intersection point of the first and second braces to an intersection point between the first and second parts of the first brace being approximately equal to a distance between an intersection point of the first brace and the left leg to a mid point approximately halfway between an intersection of the first brace and the left leg and an intersection of the second brace and the left leg.

DETAILED DESCRIPTION OF THE DRAWINGS

Figure 1:
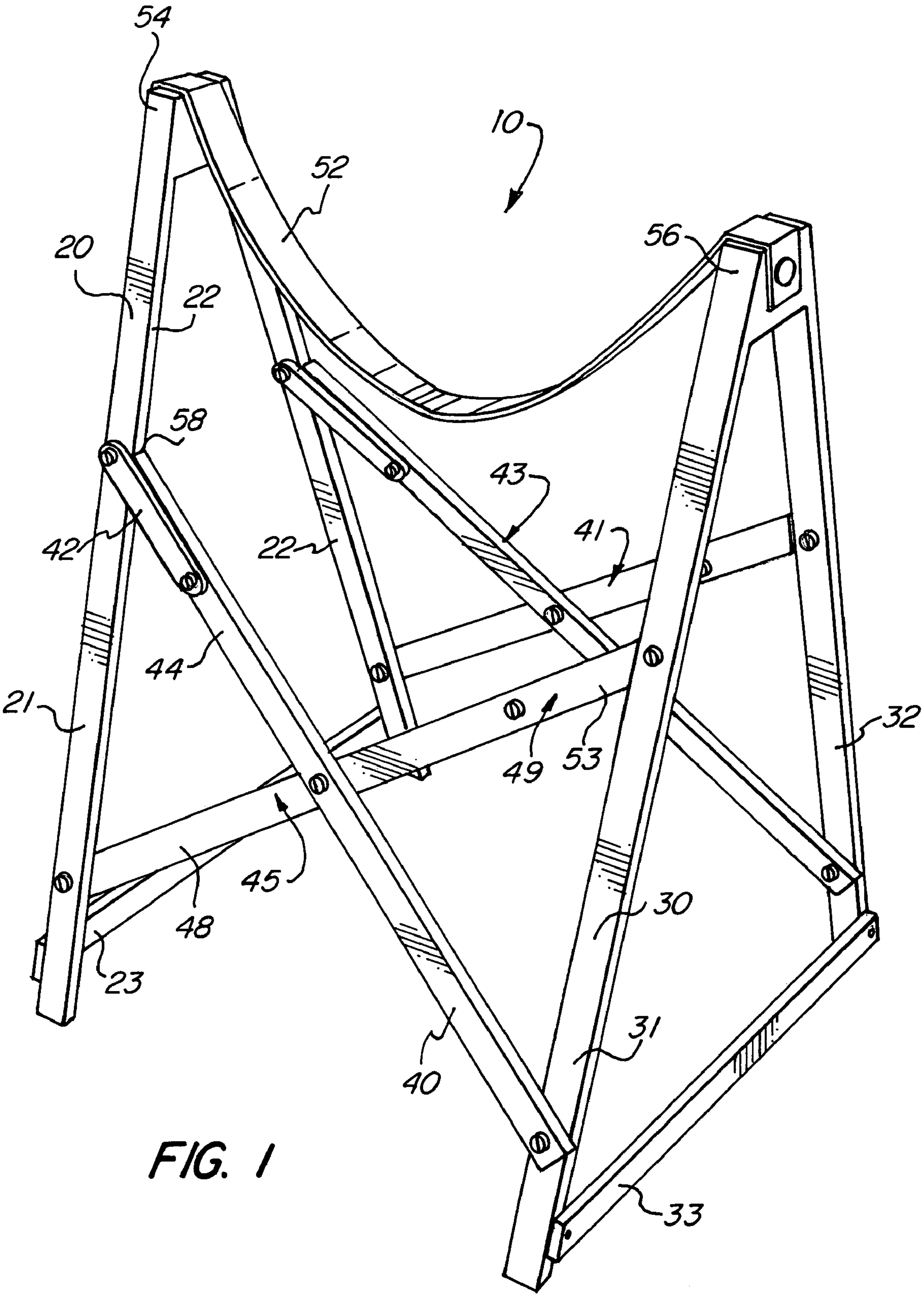
FIG. 1 depicts the stand in accordance with the invention

FIG. 1 depicts foldable stand 10 in accordance with the invention. Stand 10 includes left leg 20, right leg 30, and brace 40. Horizontal member 52 connects top 54 of left leg 20 with top 56 of right leg 30, where a work piece is placed upon and supported by horizontal member 52. As shown, stand 10 further includes second brace 48, which has all the limitations of brace 40.

In particular, the sawhorse foldable stand 10 uses the two triangular leg assemblies 20, 30 connected by two sets of folding braces, 40, 45. A fabric sling 52 is located between the upper ends of the two triangular leg assemblies 20, 30. The folding braces 40, 45 are configured in an X-shaped arrangement. The folding brace 40 consists of a first long member 44 pivotally connected to a first short member 42. The folding brace 45 consists of a second long member 48 pivotally connected to a second short member 49. The first long member 44 crosses and is pivotally hinged to the second long member 48. The first long member 44 is pivotally connected to a lower portion of one leg 31 of triangular leg assembly 30. The first short member 42 is pivotally connected to one leg 21 of the other triangular leg assembly 20 in a mid-upper portion thereof. The second long member 48 is pivotally connected to a lower portion of the one leg 21 of the triangular leg assembly 20, and the second short member 49 is pivotally connected to a mid-upper portion of the one leg 31 of the triangular leg assembly 30.

In the preferred embodiment, triangular leg assemblies 20, 30 are similarly connected between their second legs 22, 32 by another set of folding braces 41 and 43 configured in the same X-shaped arrangement.

As seen in FIGS. 2*a*–2*d*, and 4, the first and second long members 44, and 48 are sized so that their upper ends 53, 55 lay against the legs 21 and 31 of the leg assemblies 20, 30 when the stand 10 is opened and placed in use. This provides substantial structural strength to the stand. The stand 10 may be collapsed by moving the lower legs inwardly toward each other, as seen in FIGS. 2*a*–2*d*, which releases the upper ends 53, 55 of the first and second long members 44, 48 from engagement from the legs 21, 31, allowing the entire stand 10 to be folded into a convenient size.

An important design element to provide the easy opening and collapse of the stand 10 is obtained through the sizing of the short members 42, 49. As seen in FIG. 2*a*, the short members 42, 49 have a length which is equal to Length Z-length X. Length Z is the distance between where the long member 44 is mounted to the triangular leg stand and where the two long members 44, 48 are pivotally crossed on each other, e.g. the distance between points C and D. Length X is the distance between where a horizontal line from point D intersects leg 21 (at point M) and point F where short member 42 is mounted to leg 21. In other words, the first short member 42 has a length which is about equal to the difference of: a distance between where the first short member 42 is mounted to the one leg 21 of the triangular leg assembly 20 and where the first and second long members 44, 48 are pivotally crossed on each other, less the distance between where the first short member 42 is pivotally connected to the one leg 21 of the left triangular leg assembly 20 and where the second long member 48 is pivotally connected to the same leg 21 of the left triangular leg assembly 20.

In more general terms, brace 40 is pivotably connected to both left and right legs 20 and 30. Brace 40 is also made of first part 42 and second part 44, where first part and second part are pivotably connected to one another. Pivotably connected is defined to mean the two parts that have such a connection are free to rotate about the pivot point in either the clockwise or counterclockwise direction. There is no bias for the parts to rotate in a particular direction. There is ideally no rotational resistance. Because parts are free to pivot about the point of rotation without any bias or resistance, stand may be opened or folded with ease. Any known or novel structures may be used as a pivot point, such as a pin, bushing, or other fastener.

Figure 2B:
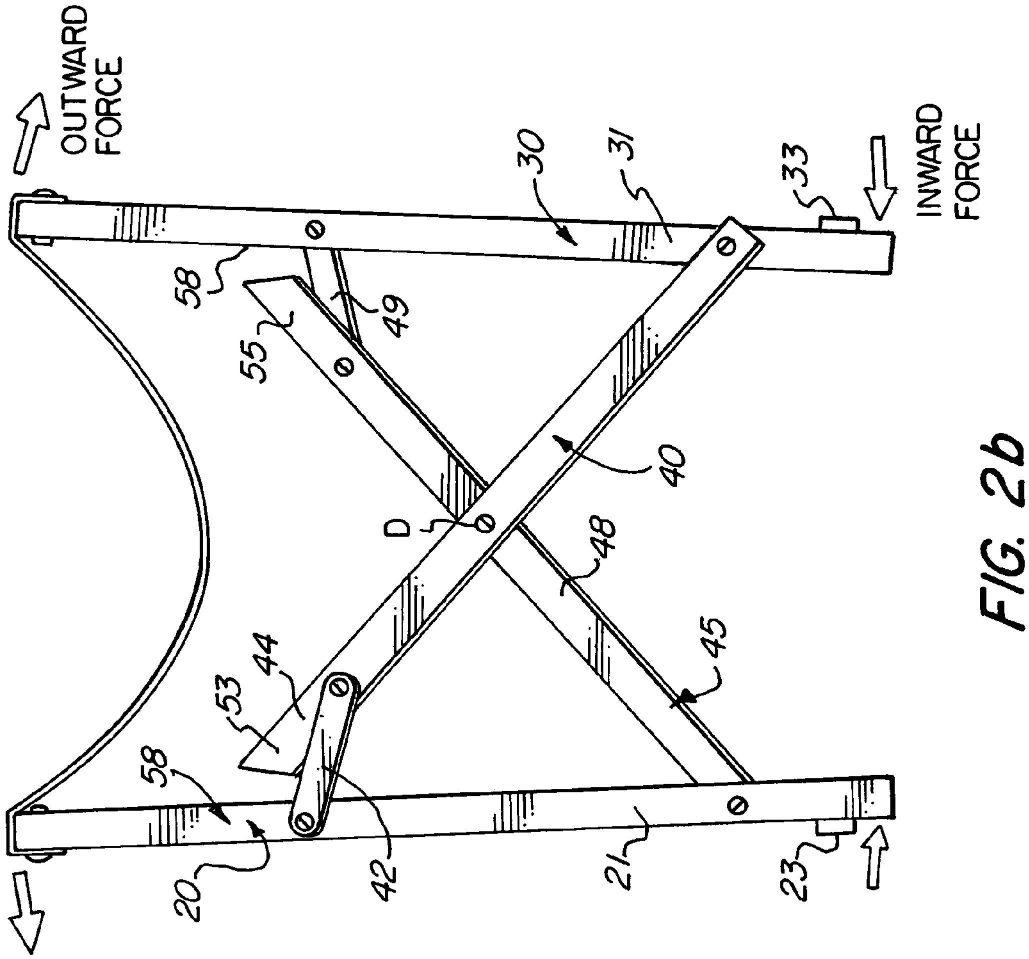
FIGS. 2*a*–2*d* depicts the stand of FIG. 1 moving from an open position to a closed position.
Figure 2A:
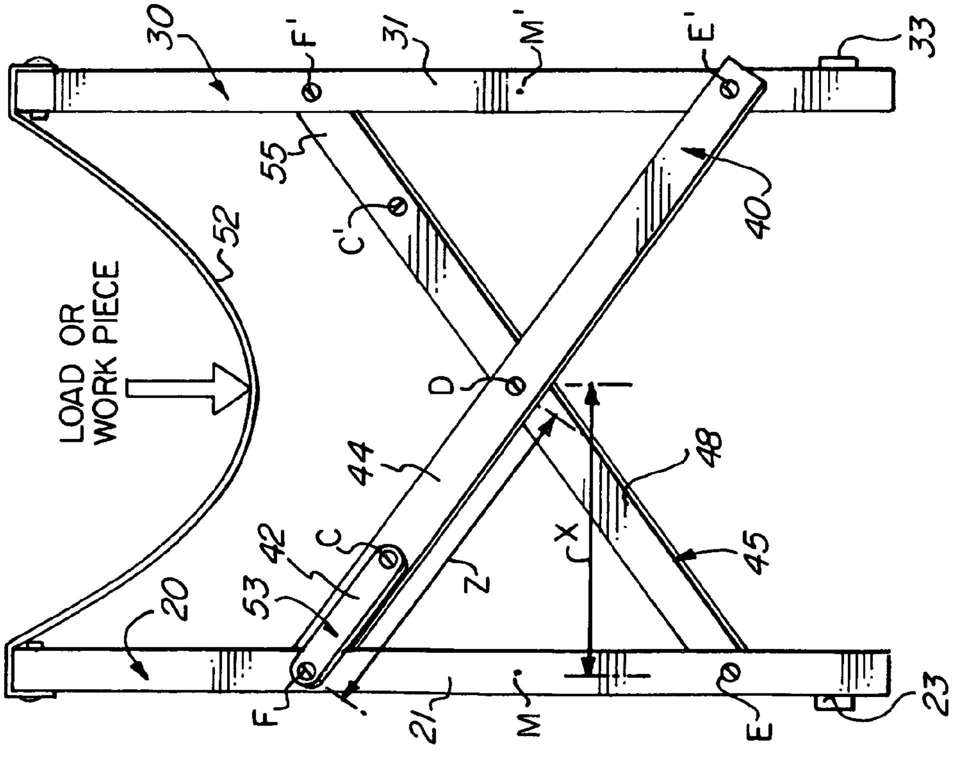

As shown in FIGS. 2*a* to 2*d*, stand 10 moves from an open position to a closed position. Initially, a user exerts an inward force on the bottom of legs 20, 30 and an outward force on legs 20, 30 in order to break first part 42 away from stop 52. See FIG. 2*b*. A subsequent step, shown in FIG. 2*c*, then merely requires a user to exert an inward force upon legs 20, 30 to move the legs toward one another in a lateral direction and first and second parts 42, 44 begin to pivot in direct relation to the distance legs 20, 30 are moved. As shown in FIGS. 2*a* to 2*d*, first part 42 rotates counterclockwise and second part 44 rotates in the opposite clockwise direction until legs 20, 30 come together in the folded, or closed, position shown in FIG. 2*d*. The initial inward and outward forces shown in FIG. 2*b* are to assist in ensuring that stand 10 does not accidentally or unintentionally close. Hence, two forces are needed to be exerted by the user to begin the closing process. Absent such an inward and outward forces, stand 10 will stay in the open position.

To open stand 10 from a closed position, no such inward and outward forces are needed. An outward force is applied to legs 20, 30, which cause first part 42 to rotate in a clockwise direction and second part 44 rotates in the opposite counterclockwise direction until first part 42 comes in contact with, or butts up against, stop 52 or side wall 22 of left leg 20. In further embodiments, stop 52 is any structure that inhibits pivoting of first and second parts 42, 44 and braces 40, 48. It may be a protrusion on left leg 20 or on first or second parts 42, 44.

Because of stop 58, or side wall 22, to inhibit further movement of any and all pivotably connected pieces, first and second parts 42, 44 are generally in a parallel relation to one another and legs 20, 30 are at their furthest distance apart from one another. Stop 58 also locks all pivotable parts in the open position shown in FIG. 2*a* until a user decides to exert the above described forces to fold stand 10. In the event stop 58 is absent, and first and second parts 42, 44 continue to pivot, legs 20, 30 would begin to move toward one another back to the folded position.

It should be known that right leg 30 has all of the same limitations as left leg 20 and, for simplicity, only left leg 20 will be described in great detail.

Stand 10 permits a user to fold and unfold the invention with ease and without loosening pieces or disassembling the structure. After overcoming the initial safety measures requiring both inward and outward forces to commence closing stand 10, a single inward motion is all that is needed to fold stand 10. Also, with a single outward motion, stand unfolds to the open position shown in FIG. 2*a*. Therefore, stand 10 permits a user to store, move, and use stand 10 quickly and easily without cumbersome operations or loose parts. In this effort, assembly or disassembly instructions are practically obviated.

As shown in FIG. 2*a*, brace 40 and second brace 48 are pivotably connected and intersect at point D. First part 42 and second part 44 are pivotably connected and intersect at point C. Brace 40 is also pivotably connected to an upper part of left leg 20 and a lower part of right leg 30. Brace 40 is arbitrarily positioned on the upper part of left leg 20. However, the remaining positions of points C, D, E, M, and connection of brace 40 to the lower part of right leg 30 are strategically placed to provide optimum operation of stand 10. Alternatively, the connection of brace 40 to the lower part of right leg 30 may be arbitrary but the connection of brace 40 to the upper part of left leg 20 would then be strategically placed.

Figure 2D:
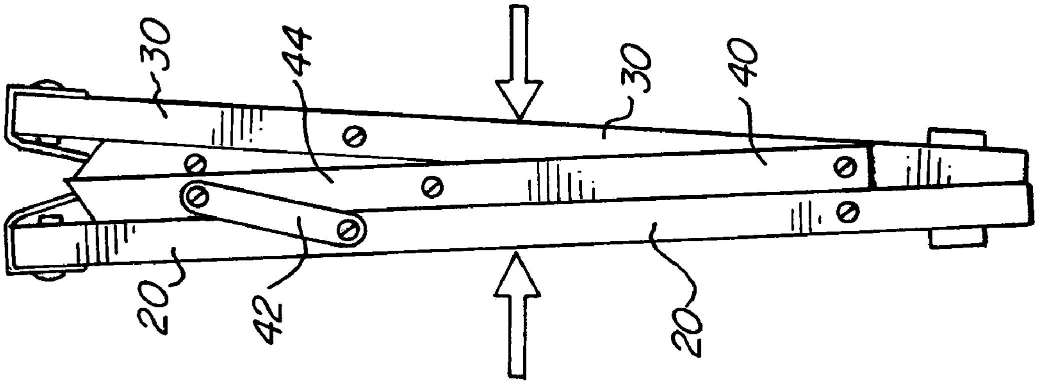
Figure 2C:
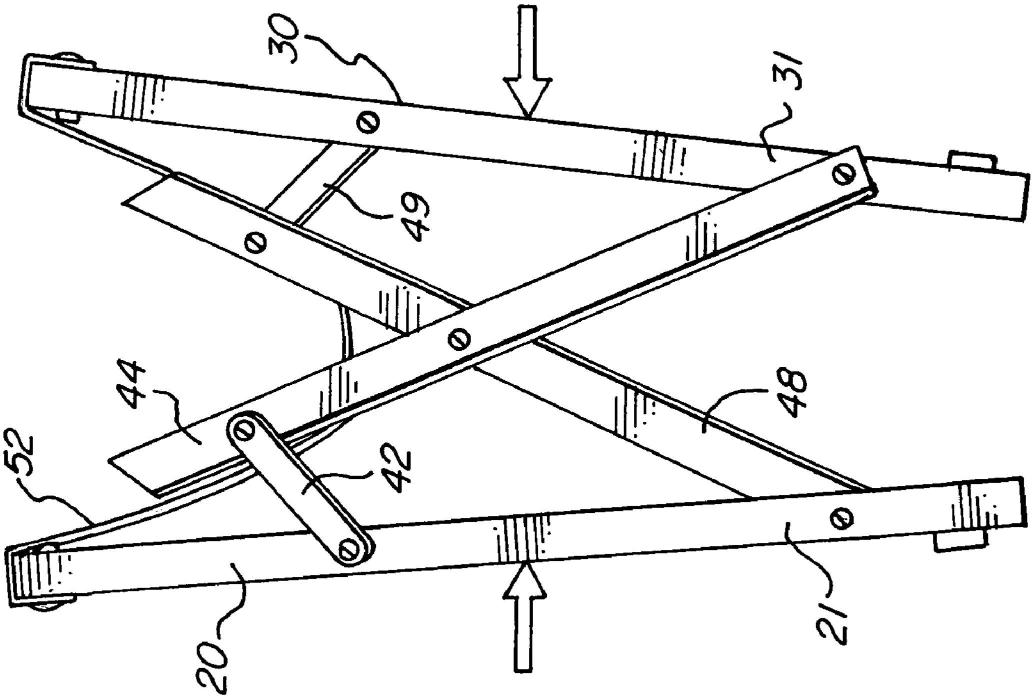
Figure 3:
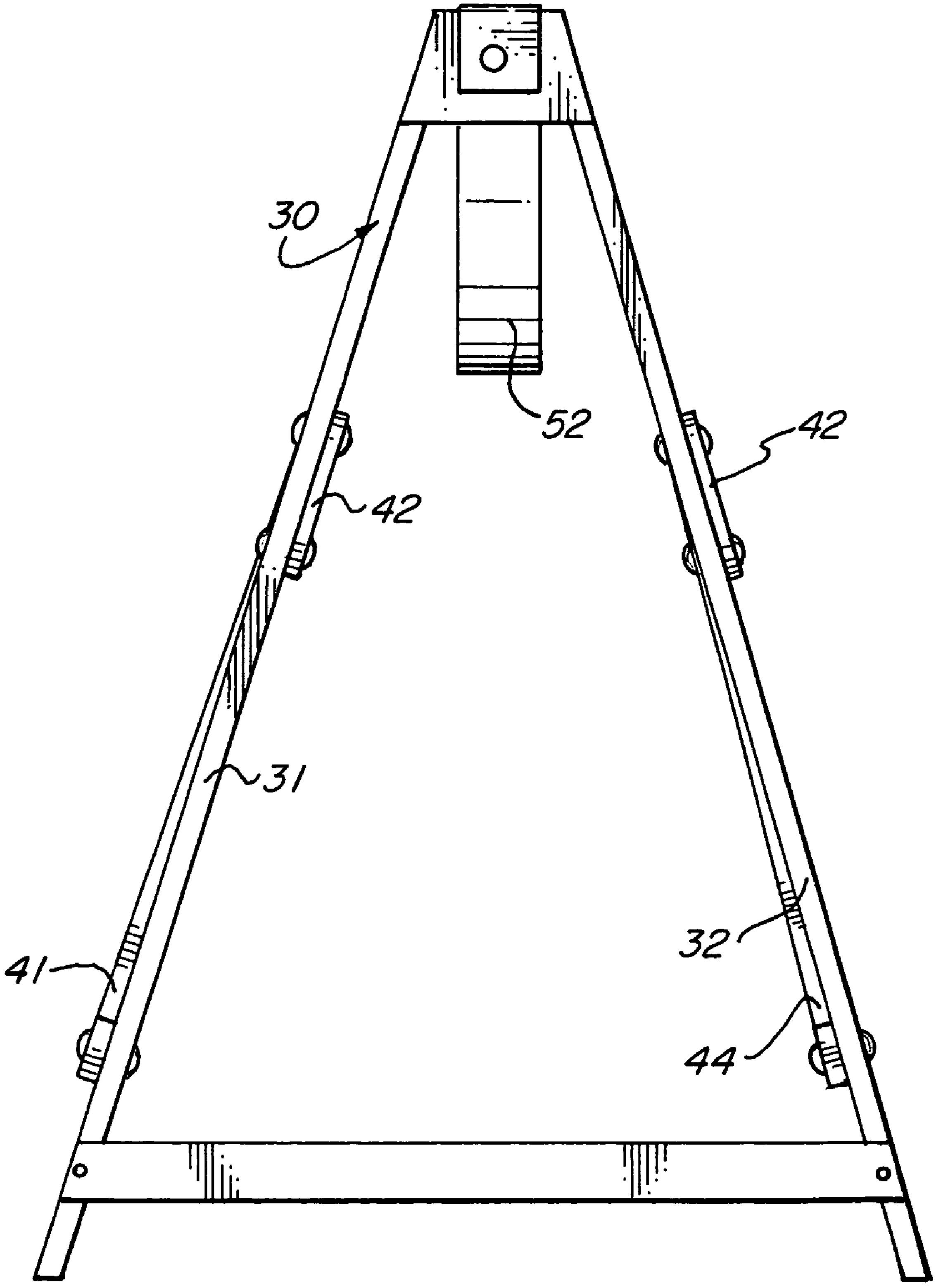
FIG. 3 depicts a side view of the stand shown in FIG. 1.
Figure 4:
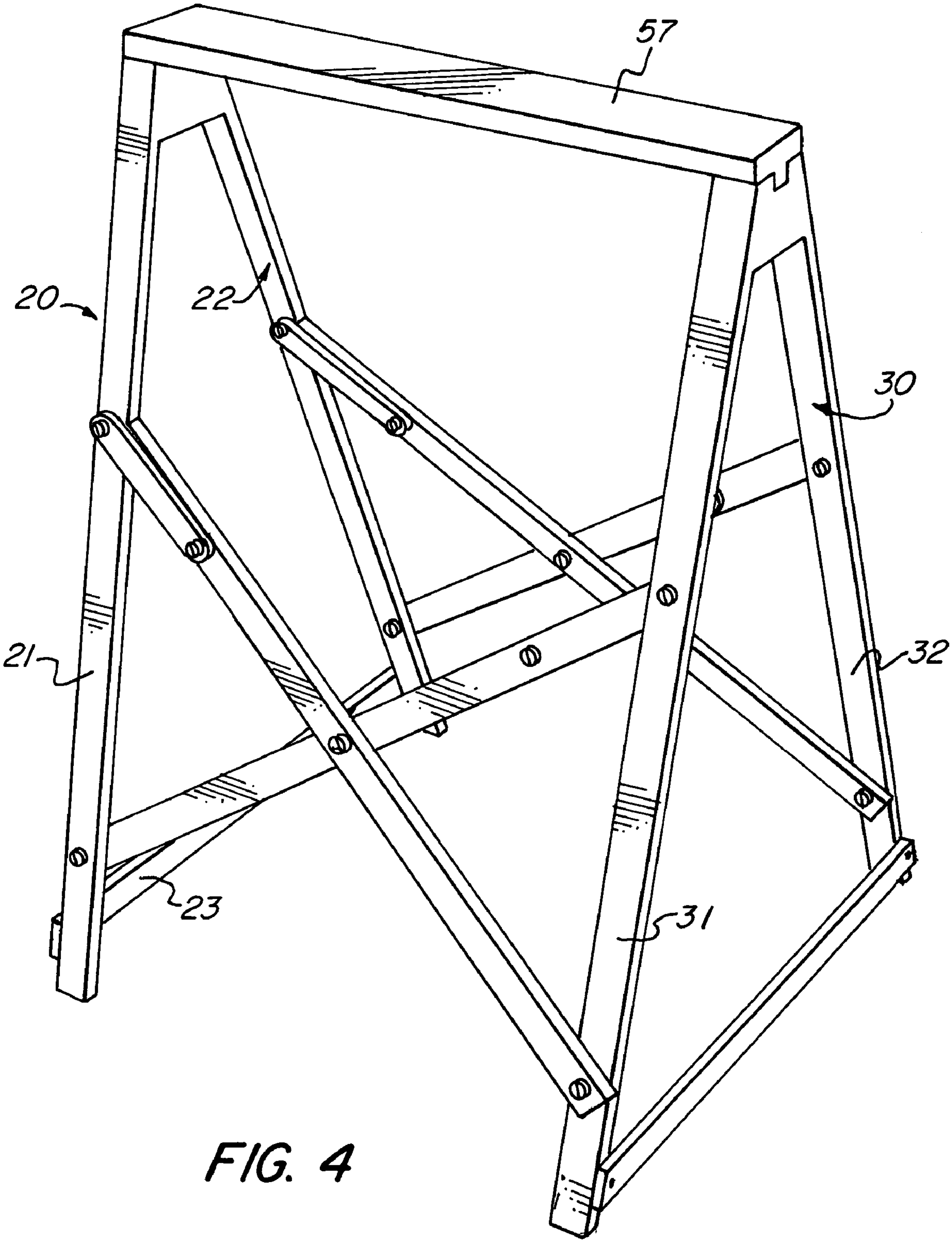
FIG. 4 depicts the stand shown in FIG. 1 with a rigid horizontal member.

Point M is a mid point between points E and F and should be approximately equal height as point D. The distance from point D to point C should be approximately equal to the distance between F and M or between M and E in order for stand to function at optimum performance. In further embodiments, where the distance from points D to C is not the same as the distance between points F and M or M and E, stand 10 still folds and unfolds as described above but may not fold completely flat, as shown in FIG. 2*d*, or may not easily open and close. Points C', E', F' and M' are mirror images of and have the same limitations as Points C, E, F and M.

It is understood that the locations of points C, D, E, F, and M as well as variations in the dimensions of the pieces of stand 10 may occur during manufacturing and, the above specified dimensions or locations should not be held to be limitations on the invention.

As shown in FIG. 2*a*, the triangle formed between points F, D, and E in the fully open position acts as a gusset to enhancing structural integrity. Placing a load on sling 52 does not cause stand 10 become unstable. In fact, the load causes stand 10 to become more stable since brace 40 and second brace 48 are pushed harder against stop 58, which makes the triangular gusset formed by points F, D, and E more secure and in turn lessens the likelihood of stand 10 collapsing or folding to the closed position.

Furthermore, as shown in all figures, each leg assembly 20, 30 includes at least one horizontal support. More particularly, two vertical supports and two horizontal supports are shown for enhancing stability of stand 10. Further embodiments may use multiple vertical and multiple horizontal supports. Additionally, for each of the two vertical supports shown for each leg, braces 40, 48 are used.

The material for forming stand 10 is any material that has sufficient rigidity to withstand the force from the load on sling 52 and braces 40 against stop 52 and yet be non abrasive when coming into contact with the work piece. Such materials include wood, PVC, fiberglass, plastic, and the like. Other materials may be metal, graphite, or other alloy composite. Preferred wooden materials are cedar, oak, or aspen. Preferred metals include extruded aluminum.

Although the preferred embodiments describe stand 10 to be a boat stand for supporting a boat, and thus a sling 52 is provided to hold a kayak or other small boat, stand 10 may be used in further embodiments to be a work horse or sawhorse.

In the embodiment where stand 10 is used as a boat stand, sling 52 is a flexible strap, such as leather, canvas, or other fabric. In the embodiment where stand 10 is used as a workhorse or sawhorse, a horizontal member 57 such as a wooden bean or beam of other rigid material will be used. See FIG. 4. In further embodiments, sling 52 is removably connected to tops 54 and 56. In this fashion, the flexible strap may be interchanged with the wooden beam 57.

The foldable stand of the invention provides a boat stand and sawhorse having extremely high strength and stability when opened, combined with a unique ease in opening it for set up, or folding it for storage.

While the invention has been described and illustrated as embodied in preferred forms of construction, it will be understood that various modifications may be made in the structure and arrangement of the parts without departing from the spirit and the scope of the invention recited in the following claims.

What is claimed is:

1. A foldable stand, comprising:

a left triangular leg assembly having one leg having an upper portion and a lower portion, and a second leg;

a right triangular leg assembly having one leg having an upper portion and a lower portion, and a second leg;

two folding braces configured in an X-shape, one folding brace having a first long member pivotally connected to a first short member and a second folding brace having a second long member pivotally connected to a second short member, said first long member crossing and being pivotally connected to the second long member, the first long member being pivotally connected to said lower portion of one leg of the right triangular leg assembly, the first short member being pivotally connected to one leg of the left triangular leg assembly in a mid-upper portion thereof, the second long member being pivotally connected to said lower portion of the one leg of the left triangular leg assembly, and the second short member being pivotally connected to a mid-upper portion of the one leg of the right triangular leg assembly;

the first long member having an upper end and being sized so that said upper end lays against and supports the one leg of the left triangular leg assembly when the stand is opened;

the second long member having an upper end and being sized so that said upper end lays against and supports the one leg of the right triangular leg assembly when the stand is opened.

2. The foldable stand of claim 1, wherein said first short member has a length which is about equal to the difference of: a distance between where the first short member is mounted to the one leg of the triangular leg assembly and where the first and second long members are pivotally crossed on each other less a distance between where the first short member is pivotally connected to the one leg of the left triangular leg assembly and where the second long member is pivotally connected to the same leg of the left triangular leg assembly.

3. The foldable stand of claim 1 comprising third and fourth folding braces configured in an X-shape, said third folding brace having a third long member pivotally connected to a third short member and said fourth folding brace having a fourth long member pivotally connected to a fourth short member, said third brace pivotably connecting an upper part of said left triangular leg assembly to a lower part of said right triangular leg assembly, said fourth brace pivotably connecting an upper part of said right triangular leg assembly to a lower part of said left triangular leg assembly, the third long member having an upper end sized so that said upper end lays against and supports said second leg of the left triangular leg assembly when the stand is opened, and the fourth long member having an upper end sized so that said upper end lays against and supports said second leg of the right triangular leg assembly when the stand is opened.

4. The foldable stand of claim 3, said third long member crossing and being pivotally connected to the fourth long member, the third long member being pivotally connected to said lower portion of said second leg of the right triangular leg assembly, the third short member being pivotally connected to said second rear leg of the left triangular leg assembly in a mid-upper portion thereof, the fourth long member being pivotally connected to said lower portion of the second leg of the left triangular leg assembly, and the fourth short member being pivotally connected to a mid-upper portion of the second leg of the right triangular leg assembly.

5. The foldable stand of claim 4, wherein said third short member has a length which is about equal to the difference of: a distance between where the third short member is mounted to the second leg of the triangular leg assembly and where the third and fourth long members are pivotally crossed on each other less a distance between where the third short member is pivotally connected to the second leg of the left triangular leg assembly and where the fourth long member is pivotally connected to the same leg of the left triangular leg assembly.

6. The foldable stand of claim 1, further comprising a horizontal member connecting a top of said left triangular leg assembly to a top of said right triangular leg assembly.

7. The foldable stand of claim 6, wherein said horizontal member is at least one flexible strap.

8. The foldable stand of claim 6, wherein said horizontal member is a rigid beam.

9. A boat stand, comprising:

a left triangular leg assembly having one leg having an upper portion and a lower portion, and a second leg;

a right triangular leg assembly having one leg having an upper portion and a lower portion, and a second leg;

first and second folding braces configured in an X-shape, said first folding brace having a first long member pivotally connected to a first short member and said second folding brace having a second long member pivotally connected to a second short member, said first long member crossing and being pivotally connected to the second long member, said first folding brace pivotably connecting an upper part of said left leg assembly to a lower part of said right triangular leg assembly, said second folding brace pivotably connecting an upper part of said right triangular leg assembly to a lower part of said left triangular leg assembly;

the first long member having an upper end sized so that said upper end lays against and supports a side of the one leg of the left triangular leg assembly when the stand is opened;

the second long member having an upper end sized so that said upper end lays against and supports a side of the one leg of the right triangular leg assembly when the stand is opened; and a flexible strap connecting a top of said left triangular leg assembly to a top of said right triangular leg assembly.

10. The boat stand of claim 9 further comprising third and fourth folding braces configured in an X-shape, said third folding brace having a third long member pivotally connected to a third short member and said fourth folding brace having a fourth long member pivotally connected to a fourth short member, said third folding brace pivotably connecting an upper part of said left leg assembly to a lower part of said right triangular leg assembly, said fourth folding brace pivotably connecting an upper part of said right triangular leg assembly to a lower part of said left triangular leg assembly;

the third long member having an upper end sized so that said third long member upper end lays against and supports a side of said second leg of the left triangular leg assembly when the stand is opened, and the fourth long member having an upper end sized so that said fourth long member upper end lays against and supports a side of said second leg of the right triangular leg assembly when the stand is opened.

11. The boat stand of claim 9 wherein:

said first long member is pivotally connected to said lower portion of one leg of the right triangular leg assembly and the first short member is pivotally connected to one leg of the left triangular leg assembly in a mid-upper portion thereof;

said second long member is pivotally connected to said lower portion of the one leg of the left triangular leg assembly and the second short member is pivotally connected to a mid-upper portion of the one leg of the right triangular leg assembly.

12. The boat stand of claim 11 wherein:

said third long member is pivotally connected to said lower portion of said second leg of the right triangular leg assembly and the third short member is pivotally connected to the second leg of the left triangular leg assembly in a mid-upper portion thereof; and said fourth long member is pivotally connected to said lower portion of the second leg of the left triangular leg assembly, and the fourth short member is pivotally connected to a mid-upper portion of the second leg of the right triangular leg assembly.

13. The boat stand of claim 11, wherein:

said first short member has a length which is about equal to the difference of: a distance between where the first short member is mounted to the one leg of the left triangular leg assembly and where the first and second long members are pivotally crossed on each other less a distance between where the first short member is pivotally connected to the one leg of the left triangular leg assembly and where the second long member is pivotally connected to the same leg of the left triangular leg assembly.

14. The boat stand of claim 12, wherein said third short member has a length which is about equal to the difference of: a distance between where the third short member is mounted to the second leg of the left triangular leg assembly and where the third and fourth long members are pivotally crossed on each other less a distance between where the third short member is pivotally connected to the second leg of the left triangular leg assembly and where the fourth long member is pivotally connected to the same leg of the left triangular leg assembly.

15. A foldable stand, comprising:

a left triangular leg assembly having one leg having an upper portion and a lower portion, and a second leg;

a right triangular leg assembly having one leg having an upper portion and a lower portion, and a second leg;

first and second folding braces configured in an X-shape, said first folding brace having a first long member pivotally connected to a first short member and said second folding brace having a second long member pivotally connected to a second short member, said first long member crossing and being pivotally connected to the second long member, said first folding brace pivotably connecting an upper part of said left leg assembly to a lower part of said right leg assembly, said second folding brace pivotably connecting an upper part of said right leg assembly to a lower part of said left leg assembly;

the first long member having an upper end sized so that said upper end lays against and supports a side of the one leg of the left leg assembly when the stand is opened;

the second long member having an upper end sized so that said upper end lays against and supports a side of the one leg of the right leg assembly when the stand is opened; and a horizontal member connecting a top of said left triangular leg assembly to a top of said right triangular leg assembly.

16. The foldable stand of claim 15 further comprising third and fourth folding braces configured in an X-shape, said third folding brace having a third long member pivotally connected to a third short member and said fourth folding brace having a fourth long member pivotally connected to a fourth short member, said third folding brace pivotably connecting an upper part of said left leg assembly to a lower part of said right leg assembly, said fourth folding brace pivotably connecting an upper part of said right leg assembly to a lower part of said left leg assembly;

the third long member having an upper end sized so that said third long member upper end lays against a side of said second leg of the left leg assembly when the stand is opened, and the fourth long member having an upper end sized so that said fourth long member upper end lays against a side of said second leg of the right leg assembly when the stand is opened.

17. The foldable stand of claim 15 wherein:

said first long member is pivotally connected to said lower portion of one leg of the right leg assembly and the first short member is pivotally connected to one leg of the left leg assembly in a mid-upper portion thereof;

said second long member is pivotally connected to said lower portion of the one leg of the left leg assembly and the second short member is pivotally connected to a mid-upper portion of the one leg of the right leg assembly.

18. The foldable stand of claim 16 wherein:

said third long member is pivotally connected to said lower portion of said second leg of the right leg assembly and the third short member is pivotally connected to the second leg of the left leg assembly in a mid-upper portion thereof; and said fourth long member is pivotally connected to said lower portion of the second leg of the left leg assembly, and the fourth short member is pivotally connected to a mid-upper portion of the second leg of the right leg assembly.

19. The foldable stand of claim 17 wherein:

said first short member has a length which is about equal to the difference of: a distance between where the first short member is mounted to the one leg of the left leg assembly and where the first and second long members are pivotally crossed on each other less a distance between where the first short member is pivotally connected to the one leg of the left leg assembly and where the second long member is pivotally connected to the same leg of the left leg assembly.

20. The foldable stand of claim 18, wherein said third short member has a length which is about equal to the difference of: a distance between where the third short member is mounted to the second leg of the left leg assembly and where the third and fourth long members are pivotally crossed on each other less a distance between where the third short member is pivotally connected to the second leg of the left leg assembly and where the fourth long member is pivotally connected to the same leg of the left leg assembly.

21. The foldable stand of claim 15, wherein said horizontal member is at least one flexible strap.

22. The foldable stand of claim 15, wherein said horizontal member is a rigid beam.

* * * * *